United States Patent Office 3,755,533
Patented Aug. 28, 1973

3,755,533
SEPARATION AND RECOVERY OF INORGANIC LITHIUM SALTS FROM OTHER METAL SALTS
Arthur W. Langer, Jr., Watchung, and Thomas A. Whitney, Linden, N.J., assignors to Esso Research and Engineering Company
No Drawing. Continuation-in-part of application Ser. No. 808,328, Mar. 18, 1969. This application Nov. 26, 1971, Ser. No. 202,645
Int. Cl. C01a 1/28
U.S. Cl. 423—181
6 Claims

ABSTRACT OF THE DISCLOSURE

Inorganic lithium salt mixtures are separated into components as well as inorganic lithium salts are separated from other metal salts by complexation with a monomeric or polymeric organic chelating agent. The salt may be recovered thereafter by destabilization of the complex. The chelating agent is a secondary or tertiary polyamine or aminoether.

This application is a continuation-in-part of copending application bearing Ser. No. 808,328 filed Mar. 18, 1969.

In one aspect, this invention relates to a method for separating lithium salt mixtures into individual components.

In another aspect, this invention relates to a method for separating inorganic lithium salts from other metal salts by complexation with certain chelating agents.

Generally, the methods used heretofore to separate lithium salt mixtures into components or to separate lithium salts from mixtures of other metal salts such as sodium and potassium salts employed fractional crystallization or solvent extraction. For example, to separate a mixture of LiCl and LiBr, ethyl ether was employed to dissolve LiBr leaving LiCl as a residue. However, a mixture of LiBr and LiI could not be separated via this procedure as both salts are very soluble in ether. Mixtures of more than two lithium salts could be extremely difficult or impossible to separate by solvent extraction.

Fractional crystallization has long been employed as a means to separate lithium salts from other metal salts. For example, in the commercial production of lithium salts from brine, it is the practice to allow the brine to evaporate over a period of many months in a series of ponds. Other metal salts crystallize from the brine solution thereby enriching the mother liquor in lithium content. Finally, the lithium is obtained by precipitating it as the carbonate. Lithium has a higher heat of hydration than that of the other Group I and II salts present and tends to stay in solution as the other salts such as NaCl and KCl crystallize. The great disadvantage of such a separation process is that it is a multistage process which is very slow. Furthermore, a mixture of lithium salts, such as LiCl, LiBr and LiI, all of which are extremely water soluble could not be separated to any great degree whatsoever by this method. The present invention for separating lithium salts does not suffer from the above limitations and complete separations may be achieved via chelate formation with polytertiary alkyl amines in a single-stage operation requiring very little time.

Bedell in U.S. 3,258,490 describes the precipitation of lithium perchlorate from a diethyl ether solution as an insoluble complex using alpha, omega, *primary* alkylene diamines containing at least three carbon atoms between the nitrogen atoms. Bedell also discloses that tetramethylenediamine is an especially preferred diamine and he employed it to separate excess lithium perchlorate from a 1:1 eutectic of lithium perchlorate and hydrazine perchlorate. However, nowhere in U.S. 3,258,490 is mention made of employing polyamines for the separation of lithium salts from themselves or from other metal salts.

The amines and solvent disclosed in U.S. 3,258,490 are not useful for such separations as will be shown by Example 1 in the instant invention.

Roscoe et al. in U.S. 2,867,498 described a method for the separation of lithium aluminum hydride from aluminum hydride using a lower tertiary alkyl amine having one nitrogen per molecule, in particular trimethyl amine, and lower ether solvents, particularly diethyl ether. Polytertiary alkyl amines are not disclosed in U.S. 2,867,498 nor is mention made of separating one lithium salt from another or separating lithium salts from other Group I or II metal salts. The amines and solvents disclosed in U.S. 2,867,498 are, like the Bedell materials, not useful for such separations as will be shown by Examples 2 and 3 in the present invention.

The inorganic lithium salt which can be complexed from a salt mixture in the instant separation and/or purification process is one having a lattice energy less than about that of lithium hydride, preferably no greater than about 220±10 kilocalories per mole (measured at about 18° C.). The lattice energies of various inorganic lithium salts may be found in the "Handbook of Electrochemical Constants" by Roger Parsons (Academic Press, 1959).

The lithium salts useful for this invention must have less than the requisite maximum lattice energy and must also be inorganic in nature; they will normally have melting points less than about 650° C. The term "inorganic," for the purposes of this invention, means that there is no hydrocarbon radical bonded directly to the lithium atom and any hydrocarbon radical present in the anion moiety must be indirectly bonded to the lithium through a third atom other than carbon. Thus, lithium compounds such as n-butyllithium and phenyllithium do not meet the criteria and are outside the scope of this invention. On the other hand, compounds of the type LiCn, LiSCN, LiAlR$_2$Cl$_2$, LiAlH(OR)$_3$, LiBH(OR$_3$), LiOR, LiNHR or LiNR$_2$, LiSR, LiPR$_2$, LiOOCH, also LiOR\*, LiOOCR\*, LiNR\*R', etc., wherein the (\*) indicates an optically active radical, are within the scope of this invention.

Specific nonlimiting examples of useful inorganic lithium salts are those in which the anion is mono-and di-substituted amides, azide, chlorate, cyanide, chloride, bromide, iodide, nitrate, nitrite, thiocyanate and perchlorate.

Also useful are those inorganic lithium salts in which the anion is a complex metal anion which may be represented by the formula R"$_n$MX$_m$ wherein $n$ is an integer of 0 to 6, inclusive, depending on the valence of M, $m$ is an integer and $(n+m-1)$ equals the valence of M, X is a halogen or pseudohalogen, R" is a C$_2$–C$_{20}$ alkyl, aryl or aralkyl radical and M is a metal selected from the group consisting of beryllium; magnesium; Group I*b* elements (i.e. Cu, Ag, Au); Group II*b* elements (i.e., Zn, Cd, Hg); Group III elements (e.g., B, Al, Ga); Group II*a* elements other than carbon and silicon; Group V*a* elements other than nitrogen (e.g. P, As, Sb, Bi); and the transition metals, i.e. subgroup *b* of Groups IV through VIII (e.g. Fe, Co, Ni, Ti, Zr, V, Cr, Mn). The Periodic Table employed in describing this invention is that which appears on the back cover of "Handbook of Chemistry and Physics" (Chemical Rubber Co., 49th Edition).

Nonlimiting examples of useful complex metal anions include the hydridoaluminates, the hydridoborates, the chloroaluminates (tetra-, hepta-, etc.), the aluminum alkyl halides, AuBr$_4$, BF$_4$, BeCl$_4$, SnCl$_6$, PF$_6$, TiCl$_4$, Cr(CO)$_5$I, MnCl$_3$, Ni(CN)$_4$, VF$_6$, HgCl$_3$, B$_2$H$_7$, UF$_4$, AsF$_6$, etc.

Preferably, the inorganic lithium salt is one of the following: lithium chloride, lithium bromide, lithium iodide, lithium nitrate, lithium hexafluophosphate, lithium tetrafluoborate, lithium tetraphenylborate, lithium perchlorate, lithium azide, LiAsF₆, Li₂BeF₄, lithium nitrite, lithium thiocyanate, etc.

The other metal salts from which lithium salts may be separated by this process include metal salts from Group I-A and Group II metals of the Periodic Table; e.g., sodium, potassium, magnesium, zinc, strontium, barium, etc. The anions of these salts may vary widely since they can include those with lattice energies too high to form complexes as well as the complexable salts. In the former case, separation from the lithium is made easy because only the lithium will form soluble complexes. In the latter case, the separations depend upon differences in solubility between the lithium salt complexes and the other metal salt complexes. In many cases, the other metal salts may also be recovered in substantially pure form after removal of the lithium salts.

The chelating agent has one required functionality in a spatial relationship with the other required functionality(ies) in the molecule such that coordinate bonds are established between the functionalities and the lithium cation of the inorganic lithium salt. Furthermore, the ring size of the resulting complex must be greater than 3 and less than 8 members including the Li atom.

The chelating complexing agent may be sparteine, an N,N'-di-(C₁-C₄ alkyl) bispidin, tris-2(dimethylaminoethyl)-amine (iso-HMTT) as well as those compounds falling within the scope of the following general formulas:

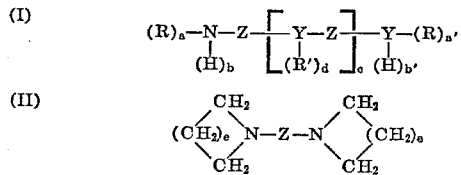

wherein $a$ is 1 or 2, $b$ is 0 or 1, and $a+b=2$; $c$ is an integer of 0 to 3 inclusive; $d$ is 0 or 1, depending on the valence of Y; $a'$ is 1 or 2, $b'$ is 0 or 1; and $a'+b'=1$ or 2 depending on the valence of Y; $e$ is an integer of 0 to 3, inclusive; R is the same or different C₁–C₄ alkyl radical; R' is hydrogen or is the same or different C₂–C₄ alkyl radical or C₆–C₁₀ aryl or aralkyl radical; Y is nitrogen or oxygen atom; and Z is a nonreactive radical selected from the group consisting of:

(1) C₄–C₁₀ cycloaliphatic or aromatic radicals and their lower alkyl derivatives wherein said radicals are attached to the Y atoms in Formula I and the nitrogen atoms in Formula II at 1,2-positions on the aromatic rings or 1,2- or 1,3-positions on the cycloaliphatic rings; and (2) 1 to 4 methylenic radicals wherein each methylenic radical contains 0 to 2 monovalent hydrocarbon radicals of 1 to 6 carbon atoms.

Suitable nonlimiting examples of chelating agents falling within the scope of the above formula are:

cis-N,N,N',N'-tetramethyl-1,2-cyclopentanediamine;
N,N,N',N'-tetramethyl-1,2-cyclohexanediamine [TMCHD] (cis-, trans-, or mixtures, cis and trans-TMCHD);
N,N,N',N'-tetramethyl-o-phenylenediamine;
4-ethyl-N,N,N',N'-tetramethyl-o-phenylene-diamine;
N,N,N'',N''-tetramethyl-N'-phenyl diethylenetriamine;
N,N,N',N'-tetramethyl-1,2-ethanediamine (TMED);
N,N,N',N'-tetramethyl-1,3-propanediamine;
N,N,N',N''N''-pentamethyl-diethylenetriamine (PMDT);
N,N,N',N'-tetramethyl-1,2-propanediamine;
N,N'-dimethyl-N,N'-diethyl-1,2-ethanediamine;
N,N,N',N'-tetramethyl-1-cyclohexyl-1,2-ethanediamine;
N,N,N',N'-tetramethyl-2,3-butanediamine;
N,N,N',N'-tetramethyl-1,4-butanediamine;
N,N,N',N'',N''',N'''-hexamethyltriethylenetetramine (HMTT);
tris(beta-dimethylaminoethyl)amine;
poly-(N-ethyleneimine);
poly-(N-methyl-ethyleneimine);
beta-(dimethylaminoethyl) methyl ether;
beta-(diethylaminoethyl) ethyl ether;
bis-(beta-dimethylaminoethyl) ether;
beta-(dimethylaminoethyl) ethyl ether;
gamma-(dimethylaminopropyl) methyl ether,
ortho-dimethylamino anisole;
1,2-dipiperidylethane; etc.

Particularly preferred, since they generally give rise to hydrocarbon-soluble complexes, are those chelating agents which are (1) tertiary polyamines (i.e. all of the heteroatoms are tertiary nitrogen atoms) containing at least 5 carbon atoms and at least 2 tertiary nitrogen atoms and (2) tertiary aminoethers (i.e. all nitrogen atoms present are tertiary nitrogen atoms) containing at least 5 carbon atoms and at least 1 tertiary nitrogen atom and at least one ether group. Especially preferred species of the chelating tertiary polyamines are N,N,N',N'-tetramethyl-1,2-ethanediamine (TMED),
N,N,N',N'-tetramethyl-1,3-propane diamine (TM-1,3-PD),
N,N,N',N'-tetramethyl-1,2-cyclohexanediamine (cis, trans-, or mixtures)(cis- and trans-TMCHD),
N,N,N',N'',N''-pentamethyldiethylenetriamine (PMDT),
N,N,N',N'',N''',N'''-hexamethyl triethylenetetramine (HMTT),
tris-(beta-dimethylaminoethyl)amine (iso-HMTT),
N,N,N',N'',N''',N'''',N''''-heptamethyltetramethylene-pentamine (n-HMTP),
N-(3-methyl-3-azabutyl)-N'-(3,6-dimethyl-3,6-diazaheptyl)piperazine,
poly-(N-methyl ethyleneimine), etc.

Especially preferred species of the tertiary aminoethers are beta-dimethylaminoethyl) methyl ether, 2-methoxy-cyclohexyl dimethylamine, etc.

The procedure used to separate a lithium salt from a particular salt mixture depends upon the nature of the salt mixture. Generally, the mixture will be one of three types:

(a) The mixture contains only lithium salts all of which form chelates;

(b) The mixture only contains lithium salts, but not all of the components form chelates, and (c) The mixture contains lithium salts as well as salts of other metals belonging to either Group I or II of the Periodic Table of the Elements (source of table: "Handbook of Chemistry and Physics," Chemical Rubber Company, 45th Edition (1964) p. B–2, such as sodium, potassium and calcium, etc. However, not all mixtures of all lithium salts may be separated by means of this invention. The critical requirement is that at least one lithium salt of the mixture forms a chelate with the complexing agent. Thus, only if at least one component of the mixture is a lithium salt having a lattice energy less than about that of lithium hydride (220±10 Kcal./mole) can a separation be achieved using the best chelating agent. Table I lists the lattice energy of several lithium salts and Table II gives solubility and stability data for a variety of chelates.

Table I.—Lattice energies of lithium salts *

| Compounds: | Lattice energy (Kcal./mole) |
|---|---|
| Li₂O | 669–699 |
| Li₂SO₄ | 665 |
| LiF | 244–248 |
| LiH | 217–234 |
| LiNO₂ | 214 |
| LiCl | 195–206 |
| LiNO₃ | 193–199 |
| LiBr | 189–193 |
| LiN₃ | 184–191 |
| LiBH₄ | 186 |
| LiI | 175–180 |

* Several authors as compiled in M.F.C. Ladd and W. H. Lee in H. Reiss, ed., Progr. Solid State Chem. vol. I, Pergamon Press, London, 1964.

TABLE II

| Lithium salt | Complexing agent | Decomposition temp., °C. (at ~0.5 mm. Hg) | Solubility in benzene (molar) |
|---|---|---|---|
| LiCl | trans-TMCHD | 29 | 0.5 |
| LiBr | trans-TMCHD | 125 | 0.8 |
| LiI | trans-TMCHD | 203 | 0.3 |
| LiBr | cis-TMCHD | 80 | ~0.1 |
| LiAlH$_4$ | TM-o-PD [k] | | 1.01 |
| LiI | TM-o-PD [k] | 97 | 0.4 |
| LiBr | TMED | 50–100 | 1.6 |
| LiNO$_3$ | TMED | | 0.3 |
| LiAlH$_4$ | TMED | 125 (at 1.3 mm.) [a] | 0.82 |
| LiBH$_4$ | TMED | | 1.0 |
| LiAlH$_4$ | 2TMED | [b] | 0.17 |
| 2LiBr | HMTT | ~143 | ~0.1 |
| LiBr | HMTT | ~40 | ~0.3 |
| LiNO$_3$ | HMTT | | [j] >3.0 |
| LiBH$_4$ | HMTT | | 3.0 |
| LiAlH$_4$ | HMTT | >200 [c] | 0.005 |
| LiBF$_4$ | HMTT | | 1.3 |
| 3LiI | HMCHT | 60 | >0.1 |
| LiI | HMCHT | 72 | 0.2 |
| LiCl | PMDT | 70 | 2.5 |
| LiBr | PMDT | 86 [d] | 2.5 |
| LiI | PMDT | Sublimes [e] | 2.5 |
| LiNO$_3$ | PMDT | | 2.66 |
| LiBH$_4$ | PMDT | 75 (at 1 mm.) [f] | (i) |
| LiAlH$_4$ | PMDT | [g] | 1.8 |
| LiBF$_4$ | PMDT | [h] | 0.19 |
| LiPF$_6$ | PMDT | | 1.25 |
| LiB(C$_6$H$_5$)$_4$ | PMDT | | 0.04 |
| LiCl | iso-HMTT | 75° C | ~0.5 |
| LiNO$_2$ | iso-HMTT | | >1.0 |
| LiNO$_3$ | iso-HMTT | | 1.0 |
| LiBF$_4$ | iso-HMTT | 120–125° C | >1.0 |
| LiCl | n-HMTP [l] | 100–105° C | >2.0 |
| LiBr | n-HMTP [l] | 80–85° C | >2.0 |

[a] Blackens above 176° C.
[b] M.P. 118–120° C.
[c] Stable to 200° C.; M.P. >200° C.
[d] M.P. 92–93.5° C.
[e] M.P. 89–110° C.
[f] M.P. 74–81° C.
[g] Sublimes w/o decomp. at 125° C./0.5 mm.; M.P. 150–155° C.
[h] M.P. 118–121° C.
[i] Forms gel—solubility greater than 3 molar at 25° C.
[j] HMTT·LiNO$_3$ is a liquid at 25° C. and is miscible with benzene.
[k] N,N,N',N'-tetramethyl-o-phenylenediamine.
[l] N,N,N',N'',N''',N'''',N''''-heptamethyltetraethylenepentamine.

Some examples of separations that cannot be achieved by this invention are LiF from Li$_2$SO$_4$, LiH from Li$_2$O and Li$_2$CO$_3$ from LiOH since these all have lattice energies greater than 220±10 Kcals.

The procedure for separating a Type A mixture of, for example, LiCl, LiBr and LiI using trans-TMCHD in xylene as the chelating agent is to contact the mixture with the solution at a temperature somewhat above 125° C. At such a temperature, TMCHD·LiI will form but TMCHD·LiCl and TMCHD·LiBr will not as the latter two chelates are unstable at such a temperature. Lithium iodide can thus be selectively removed from the salt mixture as the xylene soluble chelate by filtration. After removal of LiI is complete, lowering of the process temperature to about 100° C. permits formation of TMCHD·LiBr which is xylene soluble and filtration then leaves a residue of only LiCl. Pure LiBr and LiI can then be recovered from the respective chelates by heating them under vacuum or in a high boiling inert diluent whereupon the chelating agent is stripped from the chelates and can be recycled.

Hence, by knowing the solubilities and decomposition temperatures of the respective chelates of the components of a lithium salt mixture, and selecting the proper operating temperature, a continuous cyclic process can be devised in which one equivalent of chelating agent could separate many equivalents of salts. In attempting a particular salt separation, consideration should be given to the chelating ability of the complexing agent. The higher the lattice energy of the lithium salts the more selective complex formation will be; i.e. only chelating agents capable of forming quite stable complexes will combine with lithium salts having lattice energies near the previously stated maximum. Where the resulting complexes are of similar stability such that relative stabilities cannot be accurately predicted, a trial run followed by appropriate adjustment of temperature, concentration, and/or use of a different chelating agent will still attain the desired separation.

In separating salt mixtures of Type B, if it is a binary mixture, a single contacting with one or more equivalents of a suitable chelating agent in an appropriate solvent, such as benzene, will suffice to completely remove the chelatable salt (i.e. the lithium salt whose lattice energy is less than about 220±10 Kcal./mole) from the mixture. If the Type B mixture contains more than two components, then the considerations detailed above for Type A mixture apply as long as the additional components are chelatable. If they are not, then complete separation of the mixture into its individual components cannot be achieved via the instant invention. For example, a mixture of Li$_2$SO$_4$, LiBr, LiI and LiCl could be completely separated while a mixture of LiF, Li$_2$CO$_3$, LiNO$_3$ and LiBr could not be completely separated. In the latter mixture, LiBr and LiNO$_3$ could be recovered separately, but a residue of LiF plus Li$_2$CO$_3$ would remain which could not be separated by means of this invention.

The object of a salt separation of Type C mixture is generally to recover the lithium values to the greatest degree possible. The preferred procedure to be employed with such a mixture is to use a chelating agent having a maximum chelating ability, such as iso-HMTT and remove all the lithium salts having a lattice energy less than about 220±10 Kcal./mole. Lithium salts will be extracted preferentially as they have the most favorable cation charge-to-size ratio for chelation. Once the lithium salts have been separated from the other metal salts, the mixture could be treated as a Type A salt mixture as detailed above if further separation into individual components is desired.

The inorganic lithium salts may be present with other inorganic lithium salts or other metal salts as solid (or molten) mixtures. The various salts may be separated one from another by choosing the proper complexing agent. The molar ratio of the amount of chelating agent employed to the salt mixture depends upon the type of salt mixture to be separated. If there is only one complexable lithium salt in the mixture, the amount of chelating agent used is not critical and from about 0.1 to about 50, preferably 0.8 to 1.2, moles of chelating agent per mole of complexable inorganic lithium salt are employed. When the salt mixture contains more than one complexable lithium salt, the amount of chelating agent used is 0.8 to 1.2 moles, preferably 1.0 moles, per mole of the lithium salt present in the mixture having the *lowest* lattice energy. The lowest lattice energy lithium salt may thereby be separated from the mixture. The remaining salt mixture is then contacted with 0.8 to 1.2 moles, preferably 1.0 mole, of the same or different chelating agent based on the quantity of lithium salt present in the mixture having the second lowest lattice. Suitable adjustment of reaction mixture temperature is made if required. The above process is repeated until the lithium salt mixture is completely separated into its individual components or until all complexable lithium salts have been separated from the mixture.

The separations are carried out either in the presence or absence of a diluent. Diluents can be selected from the group consisting of inert hydrocarbons, e.g. C$_4$ to C$_{20}$ alkanes (e.g. pentane, heptane, hexadecane); C$_6$–C$_{20}$ aromatics (e..g. benzene, toluene, xylene, dibutylnaphthalene); halogenated aromatics (e.g. chlorobenzene, dichlorobenzene, hexafluorobenzene); heterocyclic compounds (e.g. pyridine, pyrrole, furan, thiophene, sulfolene, or mixtures thereof).

The amount of the diluent is not critical and the amounts in the range of 0 to 99.9% by wt. based on the complex may be conveniently employed. Thus, the complex may be prepared in the absence of solvents in the form of paste and in the presence of solvents.

The stability of the complex depends on the temperature of the reaction medium. Complexes may be readily prepared at temperatures ranging from −50° to about 200° C., preferably 0° to 100° C. Higher temperatures favor dissociation of less stable complexes so therefore the temperature may be adjusted to selectively complex the desired salt.

The separation processes may be advantageously utilized with counterflow technique, i.e., the inorganic lithium salt (complexed or uncomplexed) may be contacted with a counter-current flow of a hydrocarbon solution of a suitable chelating agent and the resultant complex may then be subjected to destabilization to recover the desired salt in a pure state.

The two steps complexation and isolation are successively repeated using the proper chelating agent with possible variations in concentration and temperature until the complex which results is that of the desired salt.

The invention is illustrated by the following examples.

EXAMPLE 1

Following the teachings of Example 2 of Bedell in U.S. 3,258,490, the following experimental work was performed.

A 1.50 g. (11.2 mmoles) portion of LiI was dissolved in 20 ml. of diethyl ether. In a separate 50 ml. portion of diethyl ether was dissolved 0.97 g. (11.2 mmoles) of LiBr and the two solutions were mixed. A small amount of precipitate deposited. The mixture was diluted to 250 ml., was refluxed and was filtered. The filtration residue weighed about 0.1 g. thus the ether filtrate contained ~2.37 g. of mixed lithium salts. To the filtrate was added a solution of 0.99 g. (11.2 mmoles) of 1,4-butanediamine in 10 ml. of ether. A white precipitate formed immediately. The reaction mixture was allowed to stand overnight and was then filtered. The filtration residue was washed four times with 50 ml. portions of ethyl ether and then dried, wt. 2.44 g. The material was analyzed: theory for $C_4H_{12}N_2 \cdot LiBr\text{-}LiI$ (percent): C, 24.20; H, 6.09; N, 14.11; Br. 20.13; I, 31.97. Found (percent): C, 23.66; H, 5.70; N, 11.37; Br, 22.74; I, 30.37. Inspection of the analytical data clearly shows that the product is a complex of 1,4-butanediamine and LiBr+LiI in a 1 to ½ to ½ mole ratio and no separation of LiBr from LiI was achieved.

EXAMPLE 2

Following the teachings of Roscoe et al. in U.S. Pat. 2,867,498, Example 2 and claim 1, the following experimental work was performed (Examples 2 and 3 herein):

A 5.62 g. portion of commercial $LiAlH_4$ was suspended in 400 ml. of anhydrous diethyl ether, the suspension was stirred overnight and then filtered. A residue of 1.43 g. of material was removed leaving 4.19 g. of $LiAlH_4$ in solution. The solution was concentrated to less than 250 ml., transferred to a 250 ml. volumetric flask and diluted to the mark with ether dried over $CaH_2$. The total weight of the solution was 179.9 g. and was calculated to be 0.44 molar in $LiAlH_4$ from the above weights. A 50 ml. aliquot (22.08 mmoles) of the $LiAlH_4$ solution was transferred to one arm of a double-barreled Schlenk tube and a solution of 0.33 g. (2.45 mmoles) of LiI in 5 ml. of ether was added to the $LiAlH_4$ solution. The arm of the Schlenk tube containing the mixed $LiAlH_4$-LiI solution was cooled until the solution reached 0° C. and the solution was kept at this temperature while 2.3 ml. (~24.5 mmoles) of liquid trimethylamine was added with stirring. (The $N(CH_3)_3$ was added through a dropping funnel having a Dry-Ice cold finger). A white precipitate formed when the $N(CH_3)_3$ was added and the reaction mixture was stirred for 30 minutes at 0° C. The reaction mixture was then transferred to the other arm of the Schlenk tube through the built-in frit. The white solid which remained on the frit was removed from the Schlenk tube in a nitrogen atmosphere dry box and was dried at 1 torr for 30 minutes, wt. 0.2 g. About 50 mg. of the solid was put in a large vial and a piece of ice was added. A violet reaction occurred and some fire was produced indicating the material contained $LiAlH_4$. When the reaction subsided an additional 2 ml. of water was added, the mixture was made acidic with dilute $H_2SO_4$, a few drops of $CCl_4$ was added followed by a small amount (~1 ml.) of 3% hydrogen peroxide solution. The mixture immediately turned brownish and after the vial was shaken for about 15 seconds, the $CCl_4$ phase was a deep violet color indicating that there had been LiI in the product sample. Thus, by the above procedure employing $N(CH_3)_3$ and diethyl ether solvent, $LiAlH_4$ and LiI were not separated. Analysis of the product by standard techniques for aluminum and iodine gave a mole ratio of Al to I of 16.6 to 1.0.

EXAMPLE 3

To a 150 ml. portion of the same $LiAlH_4$ solution used in Example 2 (~66.2 mmoles of $LiAlH_4$) was added a solution of 8.87 g. (66.2 mmoles) of LiI dissolved in 30 ml. of ether. The mixture was stirred for 30 minutes and was then filtered. The dried filtration residue weighed 1.89 g. (product A). A portion of the filtrate was evaporated leaving a solid residue, wt. 1.63 g. (product B). The remainder of the filtrate (calculated to contain 8.22 g. of lithium salts in a mole ratio of $AlH_4$ to I of 1 to 1.17 based on analytical data) was diluted to 240 ml. with ether and placed in one arm of a double-barreled Schlenk tube. To the solution, cooled to 0° C., was added 9.5 ml. of liquid $N(CH_3)_3$ (95 mmole) from a dropping funnel. The mixture became turbid but very little solids precipitated whereupon a second 9.5 ml. of $N(CH_3)_3$ was added. A large amount of precipitate formed. Addition of a third 9.5 ml. portion of $N(CH_3)_3$ gave little, if any, more precipitate. The mixture was filtered cold and the residue (product C) was dried under vacuum, wt. 11.6 g. Product C was analyzed for aluminum and iodine and was found to contain both in a mole ratio of Al to I of 1 to 1.85. The filtrate from the isolation of product C was evaporated to dryness having a residue which was analyzed for Al and I and was found to contain both in a mole ratio of 1 to 0.38. Thus, $LiAlH_4$ and LiI were not separated.

EXAMPLE 4

In a 4 ounce bottle were mixed 1.06 g. LiCl (25.0 mmoles), 1.48 g. of NaCl (25.3 mmole), 1.86 g. of KCl (24.9 mmole) and 2.38 g. of $MgCl_2$ (25.0 mmole). Benzene, 100 ml., was added along with 9.53 g. (55 mmole) of pentamethyldiethylenetriamine (PMDT). The bottle was capped, shaken for 8 hours and let stand for 18 hours. The mixture was filtered and the residue was washed with three 10 ml. portions of benzene. The dried residue weighed 8.33 g.

The filtrate and washings were evaporated yielding a white crystalline solid, wt. 5.2 g. which was PMDT•LiCl. The chelate was heated to 110° C. at 0.2 mm. for two hours to remove the PMDT leaving 1.17 g. of LiCl.

A 3.31 g. portion of the filtration residue was charged into a Soxhlet extraction apparatus and was extracted with benzene for 6 hours. The extract was evaporated on a rotary evaporator and the solid, crystalline residue was dried at 100° C. under 0.2 mm. vacuum for two hours, wt. 1.34 g. The solid was $PMDT \cdot MgCl_2$ as shown by elemental analysis, theory for $C_9H_{23}N_3MgCl_2$ (percent): C, 40.25; H, 8.63; N, 15.65; Cl, 26.41. Found (percent): C, 40.39; H, 8.90; N, 16.02; Cl, 26.69.

The results of this experiment demonstrate that a lithium halide may be separated from other alkali metal halides as well as from magnesium halides via chelate formation with polytertiary amines. Magnesium halide may then be subsequently recovered free of alkali metal salts.

EXAMPLE 5

LiBr, 2.18 g. (25.1 mmole), 3.50 g. NaNO$_3$ (41.2 mmole), 6.01 g. MgSO$_4$ (49.9 mmole) and 5.59 g. CaCl$_2$ (50.4 mmole) were suspended in 100 ml. of benzene and 3.03 g. (26.1 mmoles) of tetramethylethylenediamine (TMED) was added. The mixture was shaken for 8 hours and filtered. The residue was washed with three 10 ml. portions of benzene and dried, wt. 17.03 g. The filtrate was evaporated yielding 3.42 g. (67% of theory) of TMED•LiBr.

*Analysis.* — Theory for C$_6$H$_{16}$N$_2$LiBr (percent): C, 35.49; H, 7.94; N, 13.80; Li, 3.42. Found (percent): C, 35.26; H, 7.76; N, 14.33; Li, 3.54.

The lithium bromide is recovered from the chelate by conventional means such as heating under reduced pressure to remove the TMED.

EXAMPLE 6

1.06 g. LiCl (25 mmole), 6.17 g. BaCl$_2$•2H$_2$O (29.6 mmole) and 3.46 g. ZnCl$_2$ (25.4 mmole) were mixed and shaken with a solution of 4.77 g. of PMDT (27.5 mmole) in 100 ml. of benzene for 8 hours. The mixture was filtered and the filtrate was evaporated yielding 0.35 g. of PMDT•LiCl.

EXAMPLE 7

1.72 g. LiNO$_3$ (25 mmole), 2.12 g. NaNO$_3$ (25 mmole), 2.53 g. KNO$_3$ (25 mmole) and 5.90 g. Ca(NO$_3$)$_2$•4H$_2$O (25 mmole) were mixed and shaken for six hours with a solution of 4.37 g. PMDT (25 mmole) in 100 ml. of benzene. The mixture was filtered and the filtrate was evaporated affording 2.2 g. of PMDT•LiNO$_3$.

*Analysis.*—Calcd. for C$_9$H$_{23}$N$_3$LiNO$_3$ (percent): C, 44.63; H, 9.57; N, 23.13; Li, 2.86. Found (percent): C, 43.68; H, 9.39; N, 22.97; Li, 2.66.

EXAMPLE 8

Using the same procedure as described in the above example, a mixture of 25 mmole each of LiNO$_3$, NaCl and KBr was treated with 25 mmoles of hexamethyltriethylenetetramine (HMTT) in 100 ml. of benzene. Evaporation of the filtrate gave 97% recovery of HMTT•LiNO$_3$ having a satisfactory elemental analysis.

Similarly, one extraction of an equimolar mixture of LiBr, CaCO$_3$ and MgCO$_3$ with one-third of an equivalent of TMED in benzene gave an 88% recovery of TMED•LiBr which analyzed as follows: Theory for C$_6$H$_{16}$N$_2$LiBr (percent): C, 35.50; H, 7.94; N, 13.80; Li, 3.42; Br, 39.35. Found (percent): C, 35.24; H, 8.40; N, 14.17; Li, 4.04; Br, 39.23.

The above examples demonstrate that inorganic lithium salts may be separated from a variety of other Group I-A and II-A metal salts in a single-stage operation under ambient conditions via chelate formation with polytertiary amines. Destabilization of the chelate affords the pure lithium salt and the chelating agent is recycled to effect further separation.

What is claimed is:

1. A process for separating inorganic lithium salts having a lattice energy less than 20±10 Kcal./mole from a mixture comprising either lithium salts themselves or other metal salts wherein the metal portion is selected from the group consisting of Group I-A and Group II metals of the Periodic Table, said process comprising the steps of (1) adding, either in the absence of a solvent or in the presence of a substantially anhydrous solvent selected from the group consisting of C$_4$-C$_{20}$ alkanes, C$_6$-C$_{20}$ halogenated aromatics and heterocyclic compounds, to said mixture a chelating agent selected from the group consisting of sparteine, N,N'-di-(C$_1$-C$_4$ alkyl)-bispidin, tris-(2-dimethylaminoethyl)-amine, and those compounds having the formulas:

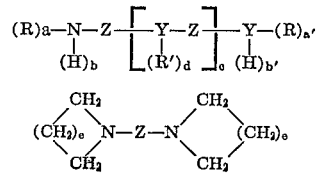

wherein $a$ is 1 or 2, $b$ is 0 or 1, and $a+b=2$; $c$ is an integer of 0 to 3 inclusive; $d$ is 0 or 1, depending on the valence of Y; $a'$ is 1 or 2, $b'$ is 0 or 1; and $a'+b'=1$ or 2 depending on the valence of Y; $e$ is an integer of 0 to 3, inclusive; R is the same or different C$_1$-C$_4$ alkyl radical; R' is hydrogen or is the same or different C$_1$-C$_4$ alkyl radical or C$_6$-C$_{10}$ aryl or aralkyl radical; Y is nitrogen or oxygen atom; and Z is a nonreactive radical selected from the group consisting of:

(a) C$_4$-C$_{10}$ cycloaliphatic or aromatic radicals and their lower alkyl derivatives wherein said radicals are attached to the Y atoms in Formula I and the nitrogen atoms in Formula II at 1,2-positions on the aromatic rings or 1,2- or 1,3-positions on the cycloaliphatic rings; and (b) 1 to 4 methylenic radicals, wherein each methylenic radical contains 0 to 2 monovalent hydrocarbon radicals of 1 to 6 carbon atoms, whereby a complex of said chelating agent with said particular lithium salt or salts having the lowest lattice energy results;

(2) isolating the complex resulting in Step 1 and leaving behind a solid residue;

(3) successively repeating Steps 1 and 2 by choosing the proper complexing agent to remove those lithium salts having a relatively higher lattice energy than the salts removed in Step 1 but still maintaining a lattice energy less than 220±10 Kcal./mole until (a) the complex which results is that of the particular metal salt having a lattice energy less than that of either the other lithium salts or the said metal salts, or (b) the solid residue comprises substantially a single uncomplexed metal salt, and (4) recovering the said particular salt by destabilization of the complex from Step 3a.

2. A process according to claim 1 wherein the anion of the lithium salt is one selected from the group consisting of chloride, bromide, iodide, nitrate, hexafluorophosphate, tetrafluoroborate, tetraphenylborate, perchlorate, azide, hexafluoroarsenate, tetrafluoroberyllate, thiocyanate and nitrite, tetrahydroaluminate and tetrahydroborate.

3. A process according to claim 2 wherein the anion of the lithium salt is the chloride.

4. A process according to claim 1 wherein the metal portion of the other metal salts is selected from the group consisting of sodium, potassium, calcium, zinc, magnesium, strontium and barium.

5. A process according to claim 1 wherein the chelating agent is one selected from the group consisting of cis-N,N,N',N'-tetramethyl-1,2-cyclopentanediamine;
N,N,N',N'-tetramethyl-1,2-cyclohexanediamine;
N,N,N',N'-tetramethyl-o-phenylenediamine;
4-ethyl-N,N,N',N'-tetramethyl-o-phenylenediamine;

N,N,N'',N'''-tetramethyl-N'-phenyl diethylenetriamine;
N,N,N',N'-tetramethyl-1,2-ethanediamine;
N,N,N',N'-tetramethyl-1,3-propanediamine;
N,N,N',N'',N''-pentamethyldiethylenetriamine;
N,N,N',N'-tetramethyl-1,2-propanediamine;
N,N'-dimethyl-N,N'-diethyl-1,2-ethanediamine;
N,N,N',N'-tetramethyl-1-cyclohexyl-1,2-ethanediamine;
N,N,N',N'-tetramethyl-2,3-butanediamine;
N,N,N',N'-tetramethyl-1,4-butanediamine;
N,N,N',N'',N''',N'''-hexamethyltriethylenetetramine, tris-(beta-dimethylaminoethyl)amine;
beta-(dimethylaminoethyl) methyl ether.

6. A process according to claim 1 wherein the chelating agent is one selected from the group consisting of trans-N,N,N',N'-tetramethyl-1,2-cyclohexanediamine; N,N,N',N'-tetramethylethylenediamine; N,N,N',N'',N''-pentamethyldiethylenetriamine; N,N,N',N'',N''',N'''-hexamethyltriethylene-tetramine; tris-(beta-dimethylaminoethyl)amine.

References Cited
UNITED STATES PATENTS

| 3,422,009 | 1/1969 | McCoy et al. | 423—499 |
| 3,459,683 | 8/1969 | McCoy et al. | 423—499 |

LEWIS GOTTS, Primary Examiner

D. R. PHILLIPS, Assistant Examiner

U.S. Cl. X.R.

260—583 P, 583 R, 570 S, 576, 577, 582; 423—499

UNITED STATES PATENT OFFICE
CERTIFICATE OF CORRECTION

Patent No. 3,755,533        Dated August 28, 1973

Inventor(s) Arthur W. Langer, Jr. and Thomas A. Whitney

It is certified that error appears in the above-identified patent and that said Letters Patent are hereby corrected as shown below:

Column 2, line 35, "LiCn" should read -- LiCN --.
Column 9, line 70, "20 ± 10" should read -- 220 ± 10 --.

Signed and sealed this 29th day of January 1974.

(SEAL)
Attest:

EDWARD M. FLETCHER, JR.        RENE D. TEGTMEYER
Attesting Officer              Acting Commissioner of Patents